(12) United States Patent
Efimov et al.

(10) Patent No.: US 11,522,955 B2
(45) Date of Patent: Dec. 6, 2022

(54) TRANSFERRING STATE INFORMATION OF RESOURCES

(71) Applicant: Oracle International Corporation, Redwood Shores, CA (US)

(72) Inventors: Andrey Efimov, Monroe, WA (US); Daniel Ricketts, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 51 days.

(21) Appl. No.: 17/015,458

(22) Filed: Sep. 9, 2020

(65) Prior Publication Data
US 2022/0078233 A1 Mar. 10, 2022

(51) Int. Cl.
*H04L 67/1095* (2022.01)
*H04L 12/66* (2006.01)
*G06F 9/50* (2006.01)
*G06F 9/448* (2018.01)

(52) U.S. Cl.
CPC .......... *H04L 67/1095* (2013.01); *G06F 9/448* (2018.02); *G06F 9/5011* (2013.01); *H04L 12/66* (2013.01)

(58) Field of Classification Search
CPC . H04L 67/10; H04L 67/1095; H04L 67/1097; H04L 12/66; G06F 3/0635; G06F 3/0646; G06F 3/065; G06F 9/448
See application file for complete search history.

(56) References Cited

U.S. PATENT DOCUMENTS

2010/0223364 A1* 9/2010 Wei ................... H04L 67/1097 718/1
2019/0364105 A1* 11/2019 Lou ....................... G06F 3/0635

* cited by examiner

*Primary Examiner* — Zi Ye
*Assistant Examiner* — Xiang Yu
(74) *Attorney, Agent, or Firm* — Invoke

(57) ABSTRACT

Techniques for transferring the state information of resources are provided. A gateway receives requests from clients and directs the requests to a resource. The gateway receives a notification that a first resource being accessed by clients will be replaced by a second resource. The first resource completes an initial transfer of state information and receives a terminal instruction. The first resource completes a final transfer of state information, including the terminal instruction, and the gateway redirects traffic, that is addressed to the first resource, to the second resource.

21 Claims, 9 Drawing Sheets

TRANSFERRING STATE INFORMATION OF RESOURCES

TECHNICAL FIELD

The present disclosure relates to transferring state information of state machines. In particular, the present disclosure relates to techniques for transferring state information from one state machine to another state machine while maintaining access to the state machine.

BACKGROUND

In systems in which users execute software on a remote server, such as in cloud systems, failures in the server result in interruption of service to users. Data must be transferred from the faulty server to a replacement server. This is a time-consuming process during which users may be unable to access systems operating on the server.

In some systems, tolerance is built into the system by simultaneously executing the software on multiple computers, called replicas. To maintain fault tolerance, each replica must behave identically. Each replica receives identical input information to be in an identical state. However, when one or more replicas fail, it is time-consuming to program replacements.

In addition, modern systems store data and serve requests from multiple users (tenants) on the same state machines. For example, a server may run multiple state machines as partitions on the server, and each state machine may service multiple tenants. If one user has a sudden increase in usage, the other users on the same state machine are impacted.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview
2. System Architecture
3. Transferring State Machine Information of Remote Resources
4. Example Embodiment
5. Resource Reconfiguration Process
6. Computer Networks and Cloud Networks
7. Miscellaneous; Extensions
8. Hardware Overview 1. General Overview One or more embodiments utilize an advanced notification process to migrate a system from serving requests using a first resource to serving requests using a second resource. The system provides advance notification, of an upcoming change from a first resource to a second resource, to a gateway that controls the flow of requests to resources. After having received the notification of the upcoming change, the gateway continues to forward requests to the first resource. A controller transmits a seal request to the first resource. When the first resource processes the seal request, the first resource is updated to a sealed state that rejects requests that are received after the seal request. The gateway forwards, to the second resource, requests rejected by the first resource based on the advance notification of the upcoming change. The gateway may start routing the new requests to the second resource either immediately or subsequent to receiving notification of the completion of a setup phase for the second resource. The setup phase for the second resource may include transferring state information from the first resource to the second resource.

One or more embodiments described in this Specification and/or recited in the claims may not be included in this General Overview section.

2. System Architecture

Figure 1:
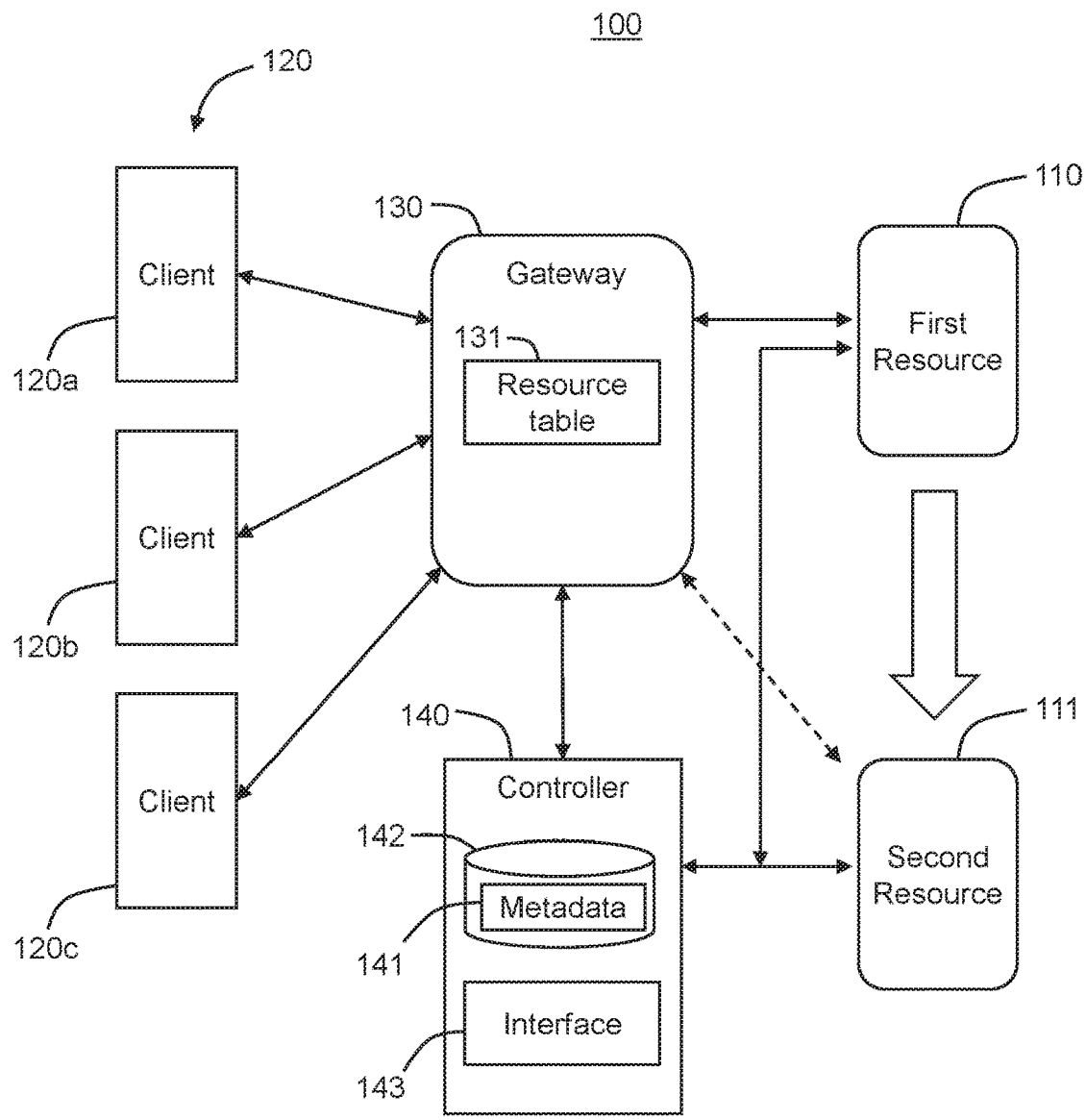
FIG. 1 illustrates a system in accordance with one or more embodiments.

FIG. 1 illustrates a system 100 in accordance with one or more embodiments. The system 100 includes a first resource 110 accessed by one or more clients 120. In FIG. 1, clients 120a, 120b, and 120c access the first resource 110 to execute the software stored in the first resource 110. For example, the first resource 110 may be partitioned to allow each client 120a, 120b, and 120c to run one or more software applications stored in the first resource. While three clients 120a, 120b, and 120c are shown in FIG. 1, embodiments are not limited to any particular number of clients, users, or tenants.

Requests, instructions, and data transmitted between the clients 120 and the first resource 110 are transmitted via a gateway 130. The gateway 130 receives requests, instructions, and data with identification data. The gateway 130 matches the identification data with the address of the first resource 110 and directs the requests, instructions, and data to the first resource 110. The gateway 130 may match the identification data with the address of the first resource 110 using a resource table 131. In one embodiment, the identification information identifies the client 120, and the resource table 131 matches each client with the first resource 110 or another resource assigned to the client 120. In another embodiment, the identification information includes a destination address, and the resource table 131 matches the destination address with an address, such as a port ID, of the first resource 110 or another resource. In this manner, the gateway 130 may direct traffic between clients 120 and resources, including the first resource 110.

In one or more embodiments, the system 100 includes multiple different gateways 130. In such an embodiment, any of the multiple different gateways 130 may receive the requests, instructions, and data to route to the first resource 110 and the second resource 111. For example, the first resource 110 may receive a first request via the a first gateway and a second request via a second gateway and may perform operations according to each request.

A controller 140 controls operations of the gateway 130 and the first resource 110. In one or more embodiments, the controller 140 generates metadata 141 and transmits the metadata 141 to the first resource 110 and the gateway 130 to control operations of the first resource 110 and the gateway 130. The metadata 141 includes operations and data that are not observed by the clients 120 as the clients 120 access the first resource 110 via the gateway 130. In one or more embodiments, the controller 140 collects metadata 141 from one or both of the first resource 110 and the gateway 130 and stores the metadata 141 in a data repository 142. Examples of metadata include instructions to alter operating system software or applications, instructions for installing new software or updating software, data regarding usage information of the first resource 110 or the gateway 130, or any other data used to control or monitor the first resource 110 and the gateway 130.

In one or more embodiments, the gateway 130 includes a routing table that is built based on the metadata received from the controller 140. The controller 140 acts as a metadata registry and contains an authoritative copy of the system configuration including routing rules. When the configuration changes occur in the system 100, the controller 140 notifies the gateway 130 of configuration changes.

In one or more embodiments, the controller 140 includes an interface 143 to receive information, instructions, or data from another system or user. For example, a system or user may direct the controller 140 to alter one or both of the first resource 110 and the gateway 130.

In one or more embodiments, the controller 140 is a local controller and the controller 140 receives information from a system controller. The system controller may detect a failure of the first resource 110 and may determine that a change is necessary to maintain client 120 access to the first resource 110. In another embodiment, the system controller determines that one of the clients 120 has a usage level that is adversely affecting the other clients 120, and that a change is necessary to maintain a quality of the clients' 120 access to the software in the first resource 110.

In one or more embodiments, the controller 140 controls the gateway 130 to redirect traffic (e.g. requests, instructions, and data) from the clients 120, previously assigned to the first resource 110, to a second resource 111. For example, the controller 140 provides the gateway 130 with routing information for the first and second resources 110 and 111 to cause the gateway 130 to route requests, rejected by the first resource 110, to the second resource 111. The controller 140 directs the first resource 110 to transfer its state information to the second resource 111 so that the first resource 110 and the second resource 111 have identical states. Once the state information is transferred, the controller 140 directs the gateway 130 to stop transferring information to the first resource 110 and to begin transferring information to the second resource 111. In this manner, one or more clients 120 assigned to operate on the first resource 110 may be reassigned to operate on the second resource 111 with minimal interruption of service to the clients 120.

In one or more embodiments, the first resource 110 and the second resource 111 are replicated resources, such as replicated state machines. Replicated resources include multiple separate computing devices that are each configured with the same architecture and operating algorithms. The separate computing devices each receive the same input requests, instructions, and messages, and are configured to be maintained in a same state. For example, when a request is received to alter information stored in the replicated state machine, the information is identically altered in each of the separate computing devices. When a request is made to perform a calculation and provide an output, the calculation is performed, and the output provided by each of the separate computing devices. Any request, instruction, or message that alters a state of any one of the separate computing devices identically alters the state of each of the other separate computing devices within the replicated resource.

Each of the separate computing devices may be partitioned according to the number of clients 120 to share resources of a remote system. By partitioning the replicated resources, each separate computing device is partitioned identically to allow separate clients to maintain separate states in each partition.

In one or more embodiments, the system may include more or fewer components than the components illustrated in FIG. 1. For example, the first and second resources 110 and 111, the gateway 130, and the controller 140 may include, execute with, or exclude one another. Such components may be local to, or remote from, each other, implemented in software and/or hardware, and/or distributed over multiple applications and/or machines. Multiple components may also be combined into one application and/or machine. Operations described with respect to one component may instead be performed by another component.

Additional embodiments and/or examples relating to computer networks are described below in Section 6, titled "Computer Networks and Cloud Networks."

In one or more embodiments, a data repository, such as the data repository 142, is any type of physical or virtual storage unit and/or device (e.g., a filesystem, database, partitions, collection of tables, or any other storage mechanism) for storing data. Further, the data repository may include multiple different storage units and/or devices. The multiple different storage units and/or devices may or may not be of the same type or located at the same physical site. The data repository may be implemented or may execute on the same computing system as the controller 140, and/or nodes in the gateway 130 or on a computing system that is separate from the controller 140 and/or nodes in gateway 130. The data repository may be communicatively coupled to the controller 140 and/or gateway 130 via a direct connection or via a network.

In one or more embodiments, the system 100 refers to hardware and/or software configured to perform distributed processing of message streams for producers and/or consumers of the streams. Examples of such operations are described below.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Transferring State Machine Information of Remote Resources

Figure 2:
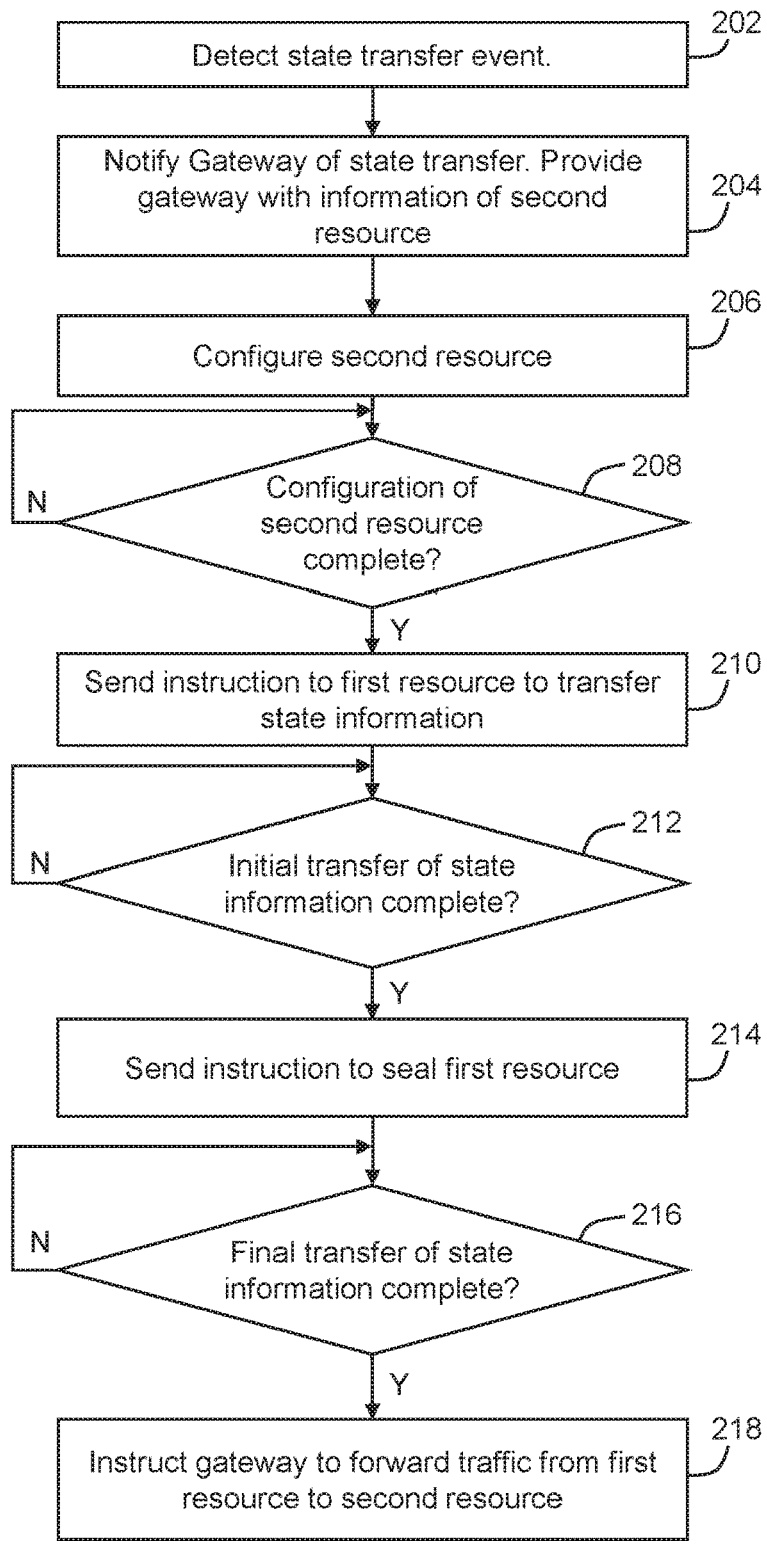
FIG. 2 illustrates a flowchart of operations of a controller to transfer a state machine in accordance with one or more embodiments.

FIG. 2 is a flowchart of operations of a controller to transfer state information of a remote resource in accordance with one or more embodiments. The controller may correspond to the controller 140 of FIG. 1. In a system in which a gateway directs traffic to and from a resource, the controller controls operations of the gateway and the resource.

In a state transfer operation according to one or more embodiments, the controller detects a state transfer event (Operation 202). For example, the controller may detect a change in traffic to a remote resource requiring rebalancing among users, clients, or tenants accessing the resource. In addition, or in the alternative, the controller may determine that the remote resource is faulty or operating outside a predetermined operation threshold for performance or security. In addition, or in the alternative, the controller may receive instructions from a system operator, user, or other system directing the controller to commence a state transfer operation.

The controller notifies the gateway that a state transfer operation is going to commence (Operation 204). For example, the controller may provide the gateway with a metadata message or instruction identifying a first resource that is going to have a state transferred to a second resource. The message or instruction may also include location information, such as an address, of the second resource.

The controller may begin configuring the second resource (Operation 206). For example, the controller may direct the provisioning of the second resource with operating systems, software programs, architecture, and operating algorithms corresponding to the first resource.

The controller waits to determine when the initial configuration of the second resource is complete (Operation 208). For example, the second resource may provide a message indicating the initial configuration is complete. Alternatively, a system controller or program may perform the provisioning of the second resource, and may provide the message to the local controller that the initial configuration of the second resource is complete.

Upon receiving the notification that the initial configuration is complete, the controller sends an instruction to the first resource to transfer its state information to the second resource (Operation 210). While the first resource is transferring state information to the second resource, the gateway continues to direct traffic to and from the first resource.

The controller eventually receives a notification that an initial state transfer from the first resource to the second resource is complete (Operation 212). The controller then sends an instruction to the first resource to seal the first resource (Operation 214), preventing further requests, messages, and instructions from being accepted by the first resource. The seal instruction also acts as a terminal message to the first resource, indicating the last entry in a state log of the first resource.

Between the time that the first resource completes an initial transfer of state information and a time that the controller sends the seal instruction to the first resource, the gateway continues transmitting requests, instructions, and messages to the first resource. Therefore, after sending the seal instruction, the controller waits to receive a message that the full transfer of state information, including any state changes implemented after sending the confirmation of the initial state transfer, is complete (Operation 216). Upon receiving the confirmation, the controller instructs the gateway to forward to the second resource any requests, instructions, or messages received by the gateway that are directed or addressed to the first resource (Operation 218).

In one or more embodiments, operations 216 and 218 may be omitted. For example, the controller may send the sealing instruction to the first resource 214. When the first resource processes the sealing instruction, it may automatically, without further instructions from the controller, begin rejecting incoming requests from the gateway. In addition, when the gateway receives rejected messages from the first resource, the gateway may automatically begin re-routing traffic to the second resource using the information provided by the controller in operation 204. In such a manner the controller may control the routing of traffic in the system without the necessity of providing instructions upon completion of a state transfer process.

Figure 3:
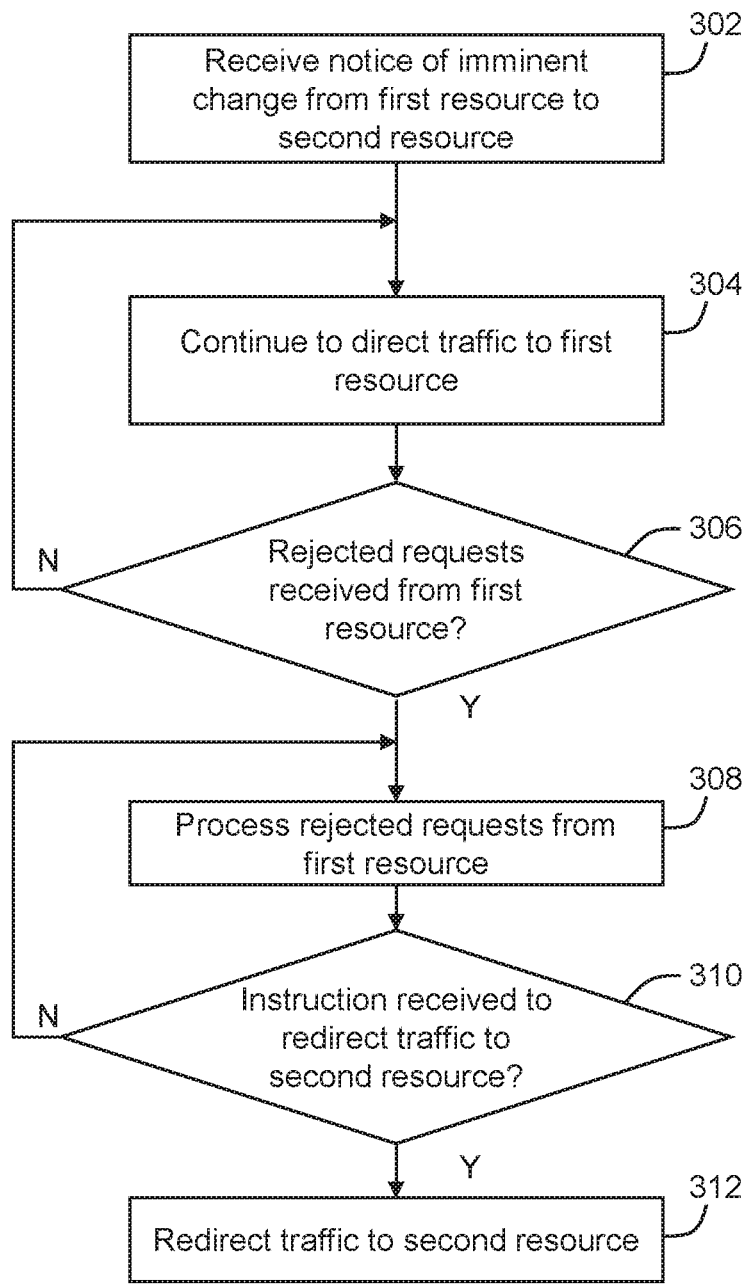
FIG. 3 illustrates a flowchart of operations of a gateway to transfer a state machine in accordance with one or more embodiments.

FIG. 3 is a flowchart of operations of a gateway to redirect traffic to remote resources in accordance with one or more embodiments. The gateway may correspond to the gateway 130 of FIG. 1.

The gateway receives requests, instructions, messages, and other data and redirects the traffic to one or more remote resources.

The gateway receives a notice from a controller that a first resource is going to be replaced by a second resource (Operation 302). The message may include an identifier for each of the first and the second resources. The gateway may store the information, such as an address, of the second resource in a data repository.

After receiving the notice, the gateway continues to direct requests, instructions, and messages to the first resource (Operation 304). In one or more embodiments, after receiving the notice of the upcoming change from the first resource to the second resource, and prior to receiving a notification of a completed state transfer, the gateway does not change how it routes requests to the first resource. In one or more embodiments, the gateway could send, upon receiving a request to access the first resource, a message to the requesting device to notify the requesting device of an upcoming transfer from the first resource to the second resource.

The controller eventually sends a seal instruction to the first resource. When the seal instruction is processed by the first resource, the first resource stops accepting further requests. The first resource rejects the requests and sends the rejected request, or a corresponding message, back to the gateway. Accordingly, the gateway begins to receive, from the first resource, rejected requests (Operation 306).

The gateway processes the rejected requests from the first resource (Operation 308). In one or more embodiments, the gateway processes the rejected requests by forwarding the requests to the second resource using the destination information from the notice received in operation 302. In addition, or in the alternative, the gateway may send a reply message to the sender of a request, instruction, or message.

The reply message may be an error message or a message informing the sender that the first resource is inaccessible. In another embodiment, the gateway may store any incoming request, instruction, or message, or transmit them to a data repository to be redirected to the second resource at a later time.

The gateway determines whether a further instruction is received, from the controller, to redirect to a second resource any traffic intended for the first resource (Operation 310). In one or more embodiments, the controller sends metadata instructions to the gateway. If the gateway determines that the further instruction has not been received, the gateway continues to manage incoming traffic by forwarding rejected requests to the second resource, storing rejected requests, sending error messages to a sending device, or in any other manner.

When the gateway determines that the instruction has been received to redirect to the second resource the traffic intended for the first resource, the gateway redirects to the second resource any traffic intended for the first resource, without first directing the traffic to the first resource (Operation 312). In an embodiment in which the gateway stored requests, instructions, or messages that were addressed to the first resource and received after sealing the first resource, the gateway first transmits to the second resource the stored requests, instructions, or messages. The gateway may redirect traffic to the second resource by determining that the traffic is intended for the first resource. For example, requests, instructions, or messages may be addressed to the first resource. Alternatively, the gateway may identify a sender of information, and the gateway may refer to a table indicating that the sender was previously assigned to the first resource.

4. Example Embodiment

Figure 5:
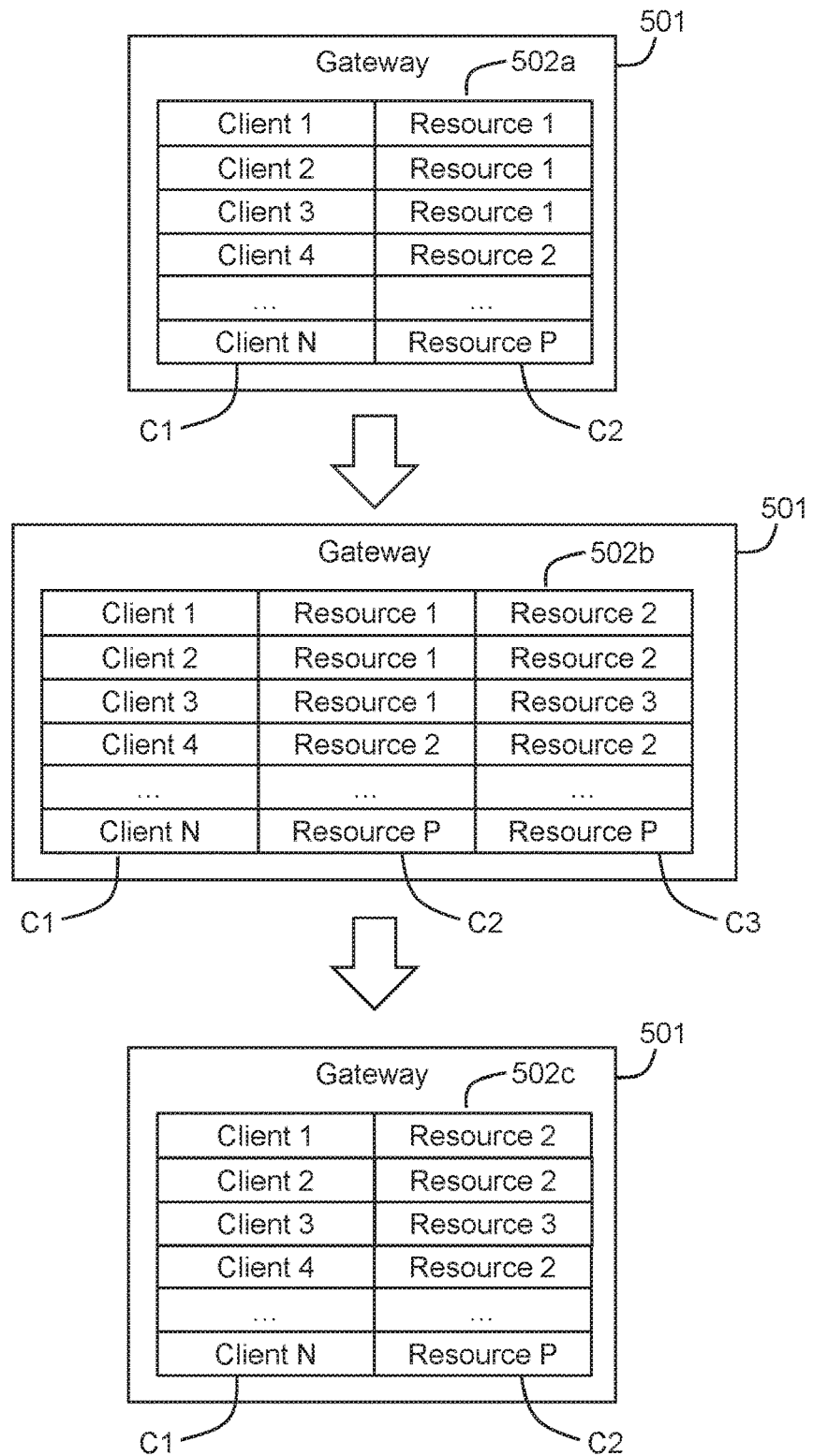
FIG. 5 illustrates an example of a resource-assignment table in accordance with one or more embodiments.

In one embodiment, the gateway redirects traffic to a second resource by altering entries in a table. FIG. 5 illustrates an embodiment in which the gateway 501 includes a table 502a identifying clients and resources assigned to the clients. The gateway 501 obtains requests, instructions, or messages from the clients and refers to the table to determine the appropriate resource allocated to the clients. Table 502a represents an initial assignment of resources (column C2) to clients (column C1).

The gateway 501 receive metadata from a controller providing information regarding a future routing change for a resource. As shown in FIG. 5, the table 502b includes a third column C3 displaying a future assignment of resources to clients.

Upon receiving a further metadata instruction from the controller, the gateway 501 redirects traffic to the second resource by altering the table entries indicating resources assigned to each client. For example, the contents of column C3 may be written into column C2 to replace the contents of column C2. Reference numeral 502c represents an altered table in which clients 1 and 2 are redirected to resource 2, and client 3 is redirected to resource 3. In one or more embodiments of the invention, the resources are assigned to multiple clients or tenants, and the traffic to the second resource includes redirecting traffic from multiple clients assigned to the same first resource to different second resources. In an alternative embodiment, the traffic of every client or tenant assigned to the first resource is redirected to the second resource.

Figure 6:
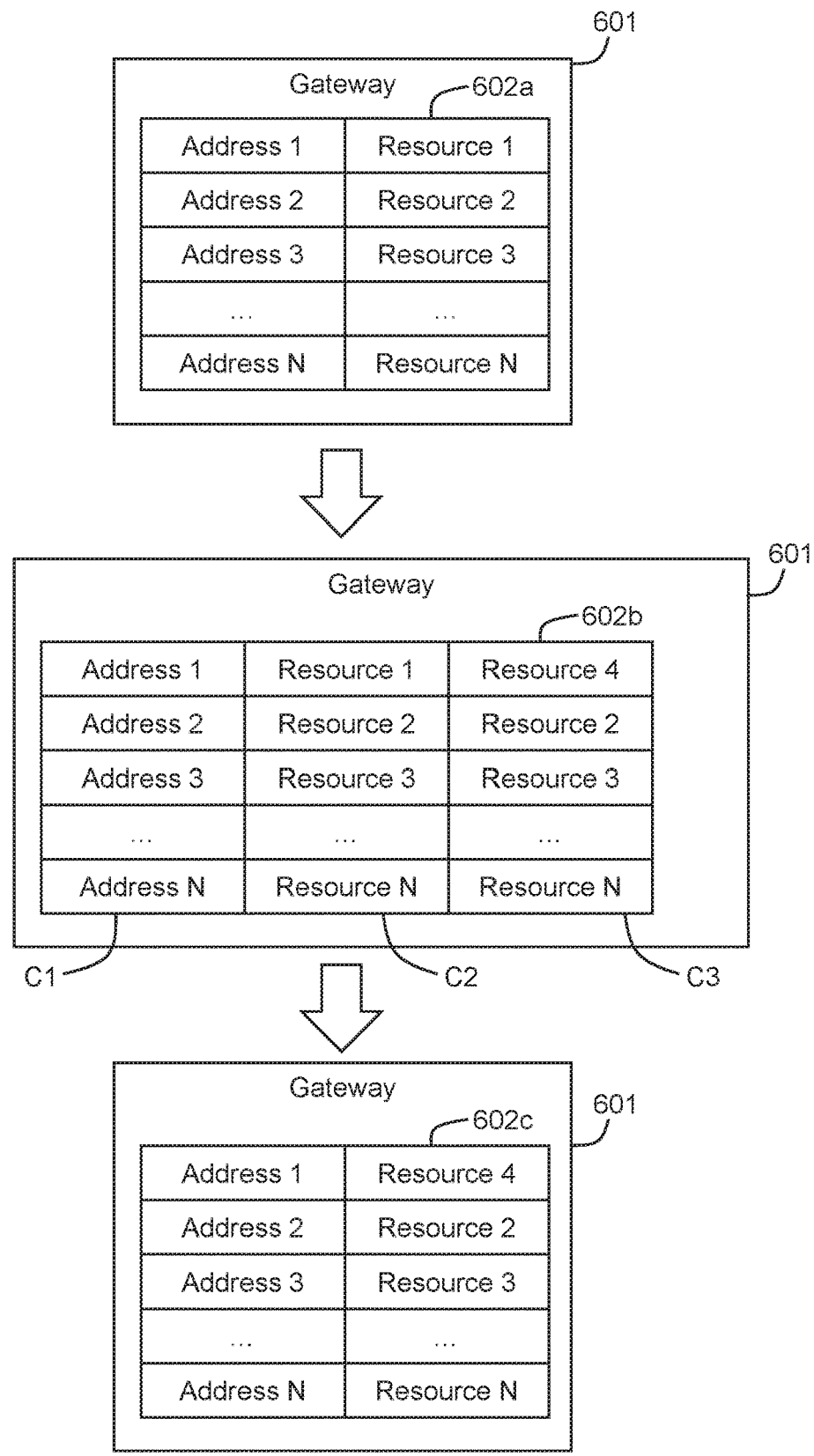
FIG. 6 illustrates another example of a resource-assignment table in accordance with one or more embodiments.

FIG. 6 illustrates an embodiment in which the gateway 601 includes a table including addresses (column C1) assigned to resources (column C2), and redirecting traffic to the second resource includes altering resources assigned to respective addresses. In FIG. 6, reference numeral 602a represents a table in which each address is assigned to a respective resource. When the gateway receives a request, instruction, or message having the respective address (Address 1-Address N), the gateway determines the resource assigned to the address and directs the request, instruction, or message to the correct resource.

When a controller notifies the gateway of an upcoming state transfer, the table may be modified, as shown by reference numeral 602b, to include a column C3 having a future assignment of the addresses. In this state, the gateway continues to route traffic to the resource indicated by column C2.

When the gateway receives a further instruction, the gateway may alter the resource assigned to a particular address. For example, the gateway may replace the contents of a column C2 with the contents of column C3. As shown in table 602c, the resource assigned to Address 1 is altered from "Resource 1" to "Resource 4," and subsequently any request, instruction, or message having the address "Address 1" is redirected to "Resource 4."

5. Resource State Transfer

Figure 4:
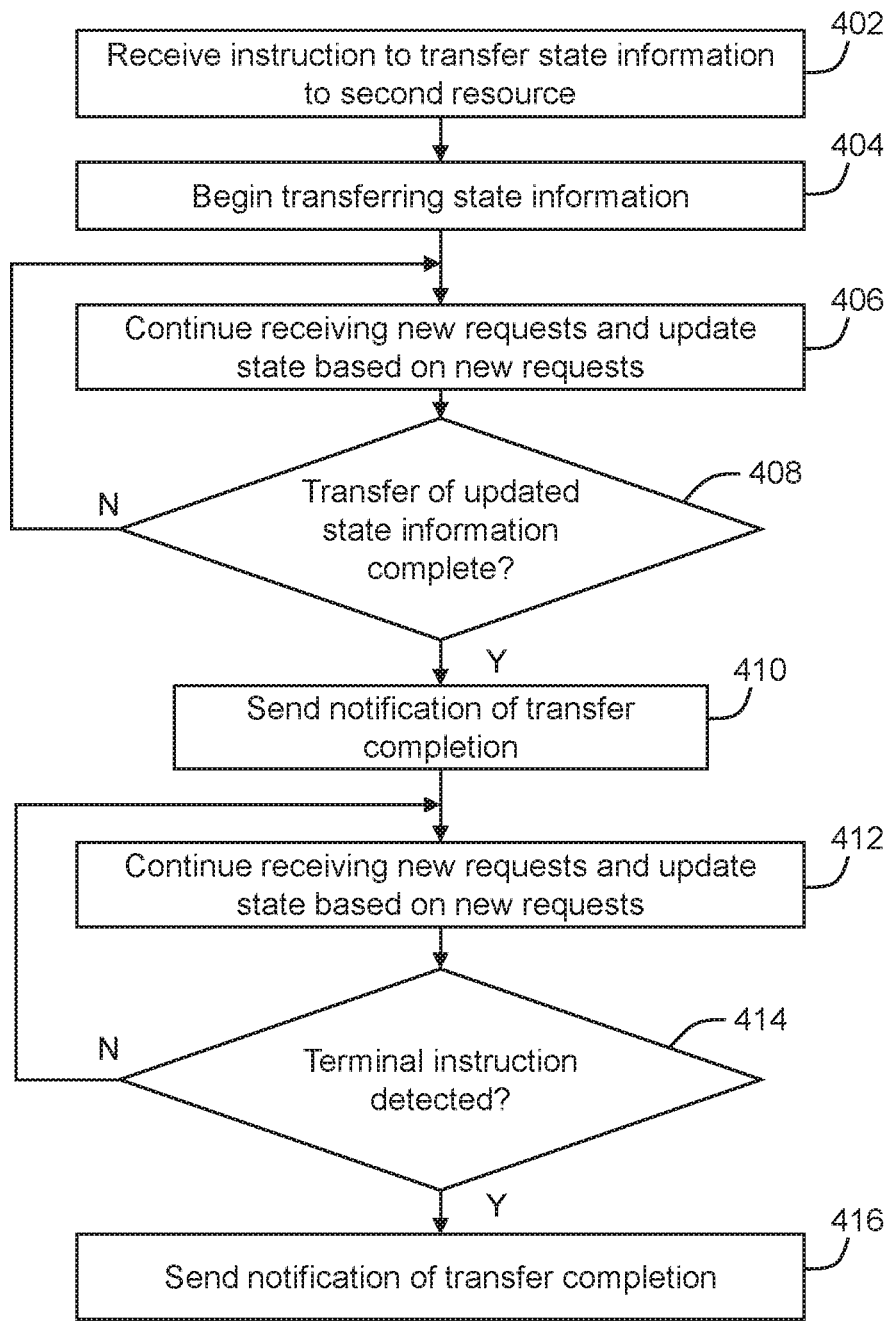
FIG. 4 illustrates a flowchart of operations of a first resource to transfer a state of the first resource in accordance with one or more embodiments.

FIG. 4 is a flowchart of operations of transferring state information from a first resource to a second resource in accordance with one or more embodiments. The first resource may correspond to the first resource 110 of FIG. 1.

A first resource receives requests, instructions, and messages from one or more clients or tenants that alter a state of the first resource. In a state transfer process, the first resource receives an instruction to transfer the state of the first resource to a second resource (Operation 402). The instruction may be received by a controller and may be in the form of control information or metadata. The state information may include, for example, a log of every request, instruction, or message that has altered the state of the first resource.

Upon receiving the instruction to transfer its state information, the first resource begins transferring its state information to the second resource (Operation 404). While transmitting the state information, the first resource continues to receive further requests, instructions, and messages that continue to alter the state of the first resource (Operation 406).

The first resource continues to transfer the state information to the second resource until it determines that the transfer of state information is complete (Operation 408). In one embodiment, the first resource determines that the transfer of state information is complete by determining that the current state of the first resource has been transferred to the second resource. The first resource then sends a notification to a controller that the initial state transfer is complete (Operation 410).

After sending the notification that the initial transfer of state information is complete, the first resource continues to receive requests, instructions, and messages that alter its state (Operation 412). These requests, instructions, and messages are processed normally by the first resource.

The first resource continues to transfer state information to the second resource until the first resource determines that a terminal instruction has been processed (Operation 407). For example, a controller may transmit a seal instruction to the first resource, and the seal instruction acts as a terminal instruction. The terminal instruction is the last instruction to be processed by the first resource and transferred to the second resource. Accordingly, when the first resource processes the terminal instruction, the first resource determines that all the state information of the first resource has been transferred to the second resource.

The first resource sends a notification to the controller that the state transfer is complete (Operation 408). In one or more embodiments, the first resource processes the terminal instruction, which is the seal instruction, and generates the notification to the controller based on processing the terminal instruction.

Figure 7A:
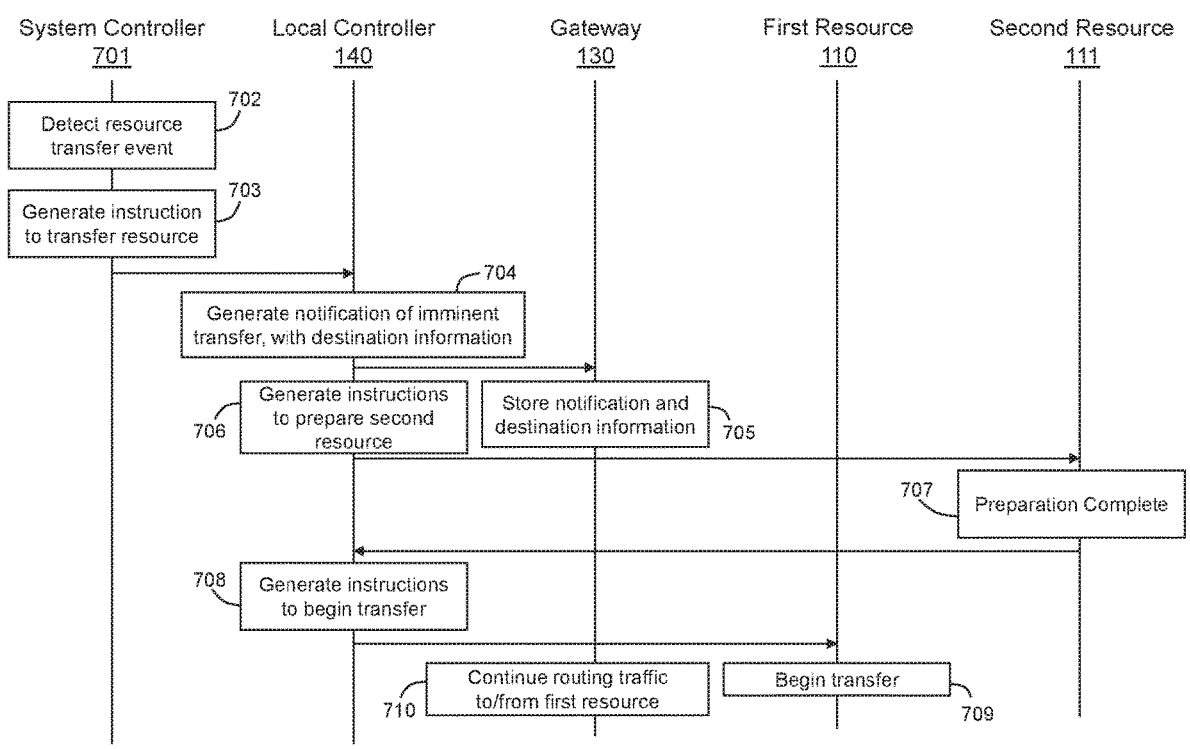
FIGS. 7A and 7B illustrate an exemplary sequence of operations involved in transferring a state machine in accordance with one or more embodiments.
Figure 7B:
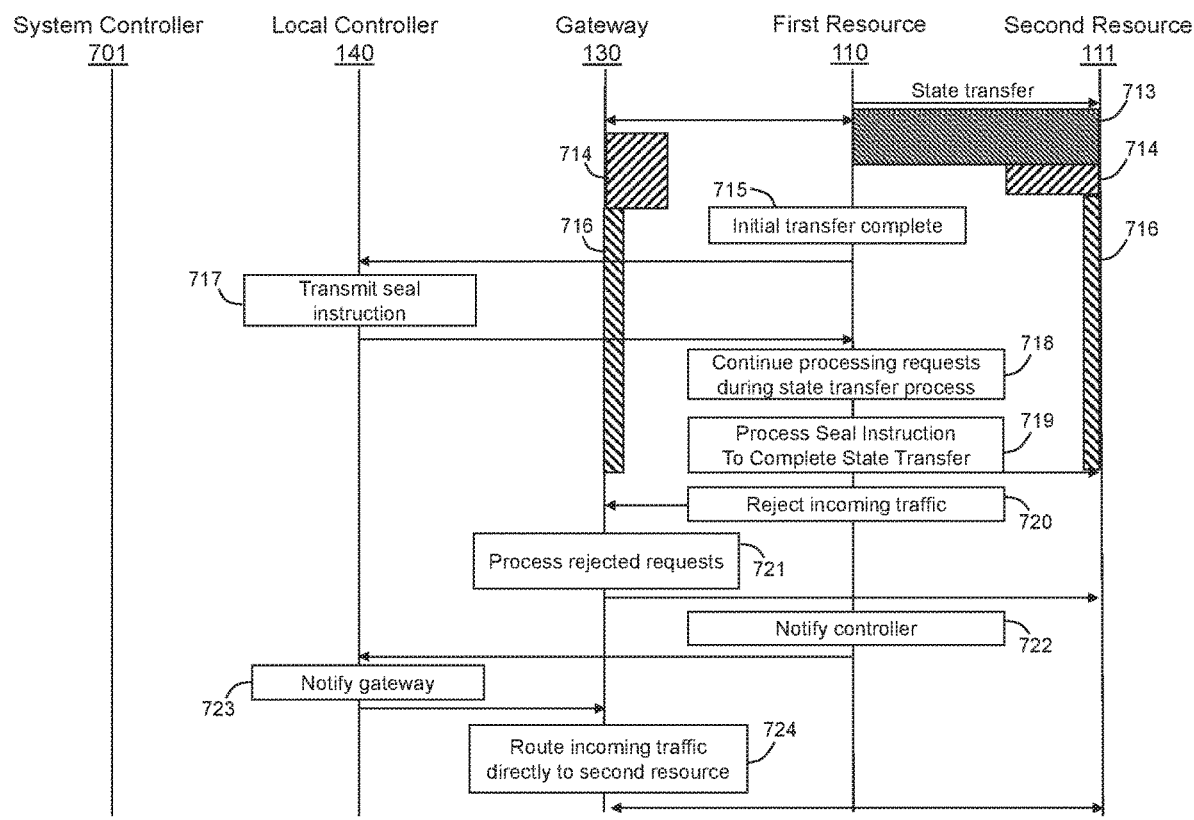

FIGS. 7A and 7B illustrate an exemplary sequence of operations involved in transferring a state of one resource to another resource in accordance with one or more embodiments.

A system controller 701 detects a resource transfer event (Operation 702), such as the failure of the first resource 110, a usage of a client 120 that adversely affects another client 120, a request for transfer from a user or system operator, or any other resource transfer event.

The system controller 701 generates an instruction to transfer a state from a first resource to a second resource (Operation 703). In one or more embodiments, the instructions comprise a metadata instruction. In one embodiment, the first resource a partition of a server having multiple partitions which may correspond to multiple different tenants. The instruction from the controller may identify one or more partitions of the server, up to all of the partitions of the server, to be transferred to a second server.

The local controller 140 receives the instruction from the system controller 701 and generates a message to notify the gateway 130 that traffic to the first resource 110 will soon be directed to the second resource 111 (Operation 704). The message may include address information of the second resource 111.

The gateway 130 stores the message, which may be in the form of metadata (Operation 705). In one or more embodiments, the gateway 130 includes a routing table, and the message directs the gateway 130 to alter the routing table to include address information of the second resource 111.

The local controller 140 also generates instructions to prepare the second resource 111 to receive state information from the first resource 110 (Operation 706). In an alternative embodiment, the system controller 701 controls the second resource 111 to prepare the second resource 111 to receive state information. Preparing the second resource 111 includes loading the second resource 111 with any operating systems and programs found on the first resource 110, and arranging the second resource 111 to have the same architecture as the first resource 110. In an embodiment in which the first resource 110 and the second resource 111 are replicated state machines, preparing the second resource 111 includes loading the second resource 111 with the same operational algorithms as the first resource 110. In one or more embodiments, preparing the second resource 111 may include partitioning a space on a server to serve as one or more state machines for one or more tenants from the first resource 110.

The second resource 111 notifies the local controller 140 that the preparation is complete (Operation 707). In one or more embodiments, the local controller 140 regularly queries the second resource 111 to determine its preparation progress, and determines that the second resource 111 is prepared based on a response to a query. In an alternative embodiment, the local controller 140 waits to receive a message from the second resource 111 without sending queries to the second resource 111.

When the local controller 140 receives the notification from the second resource 111 that the preparation is complete, the local controller 140 instructs the gateway 130 to begin the transfer of the state information (Operation 708) to the second resource 111. In one or more embodiments, the state information includes a log of requests, instructions, or modifications to the first resource 110 from an initial state of the first resource 110. However, embodiments encompass any manner of replicating the state of the first resource 110 in the second resource 111.

The first resource 110 begins the process of transferring the state information (Operation 709). Transferring the state information may include, for example, transferring a log of every request received by the first resource 110 and the resulting state change of the first resource 110.

As the state transfer progresses, the gateway 130 continues routing traffic to and/or from the first resource 110 (Operation 710). In one or more embodiments, the traffic includes requests or instructions, and each request or instruction is recorded in a log.

In FIG. 7B, the state information that was stored in the first resource 110 at the time the first resource 110 received the instruction to begin the state transfer is represented by the reference numeral 713. After the instruction is received to begin the transfer of state information (Operation 709), additional requests and instructions, represented by reference numeral 714, are routed to the first resource 110.

The first resource 110 continues transferring state information until all state information is transferred to the second resource 111, at which time the first resource 110 transmits a message to the local controller 140 that an initial transfer is complete (Operation 715). For example, in one or more embodiments the first resource 110 transfers a log of requests and instructions altering a state of the first resource 110, and the first resource 110 determines that the state information is transferred once the log has been transferred.

After the first resource 110 transmits to the local controller 140 the message that the initial transfer is complete, the first resource 110 continues receiving requests and instructions, represented by reference numeral 716. The further requests and instructions continue to alter a state of the first resource 110. The first resource 110 continues transferring the additional state information resulting from these requests and instructions to the second resource 111.

Upon receiving the notification from the first resource 110 that the initial transfer is complete, the local controller 140 generates a seal instruction to be transmitted to the first resource 110. The local controller 140 then transmits the seal instruction, which is the terminal instruction, to the first resource 110 (Operation 717).

The seal instruction functions as terminal instruction for the first resource 110. In other words, the seal instruction is the last instruction to be received and transmitted by the first resource 110 to the second resource 111

The first resource 110 continues to process requests from the gateway 130 and as it transfers the state to the second resource 111. Upon processing the seal instruction (Operation 719), the first resource 110 transfers the seal instruction to the second resource 111 to complete the state transfer to the second resource 111. Upon processing the seal instruction, the second resource 111 may begin receiving requests.

Upon processing the seal instruction, the first resource 110 rejects any further traffic directed to the first resource 110 (Operation 720). The first resource 110 sends the rejected requests back to the gateway 130.

The gateway 130 processes the rejected requests (Operation 721). In one embodiment, the gateway 130 generates a message indicating that the first resource 110 is unable to accept requests or instructions and sends the message to any client attempting to access the first resource 110. In another embodiment, the gateway 130 stores any requests or instructions directed to the first resource 110 or redirects the requests or instructions to a data repository. In addition, or in the alternative, the gateway 130 may forward rejected requests to the second resource 111.

The first resource 110 generates a message indicating that the full transfer of state information is complete (Operation 722). The first resource 110 sends the message to the local controller 140.

The local controller 140 receives the message and notifies the gateway 130 (Operation 723). In one embodiment, the notification from the local controller 140 to the gateway 130 is a direction to replace the address of the first resource 110 in the gateway 130 with the address of the second resource 111. In addition, or in the alternative, the notification from the local controller 140 may not include the address of the second resource 111. Instead, the address of the second resource 111 may be provided to the gateway 130 in the notification of Operation 704 of the upcoming change of resources from the first resource 110 to the second resource 111.

Upon receiving notification from the local controller 140, the gateway redirects to the second resource 111 any traffic that is directed to the first resource 110 (Operation 724). In an embodiment in which the gateway 130 stored any requests or instructions received after receiving rejected requests from the first resource 110, the gateway 130 may first direct the stored requests or instructions to the second resource before directing any additional requests or instructions to the second resource 111.

By the above process, a system maximizes clients' access to resources while a state transfer process is ongoing. The process by which state information is transferred between resources provides an efficient solution to system challenges including failure of replicated computers as well as load re-balancing.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread). A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application-programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
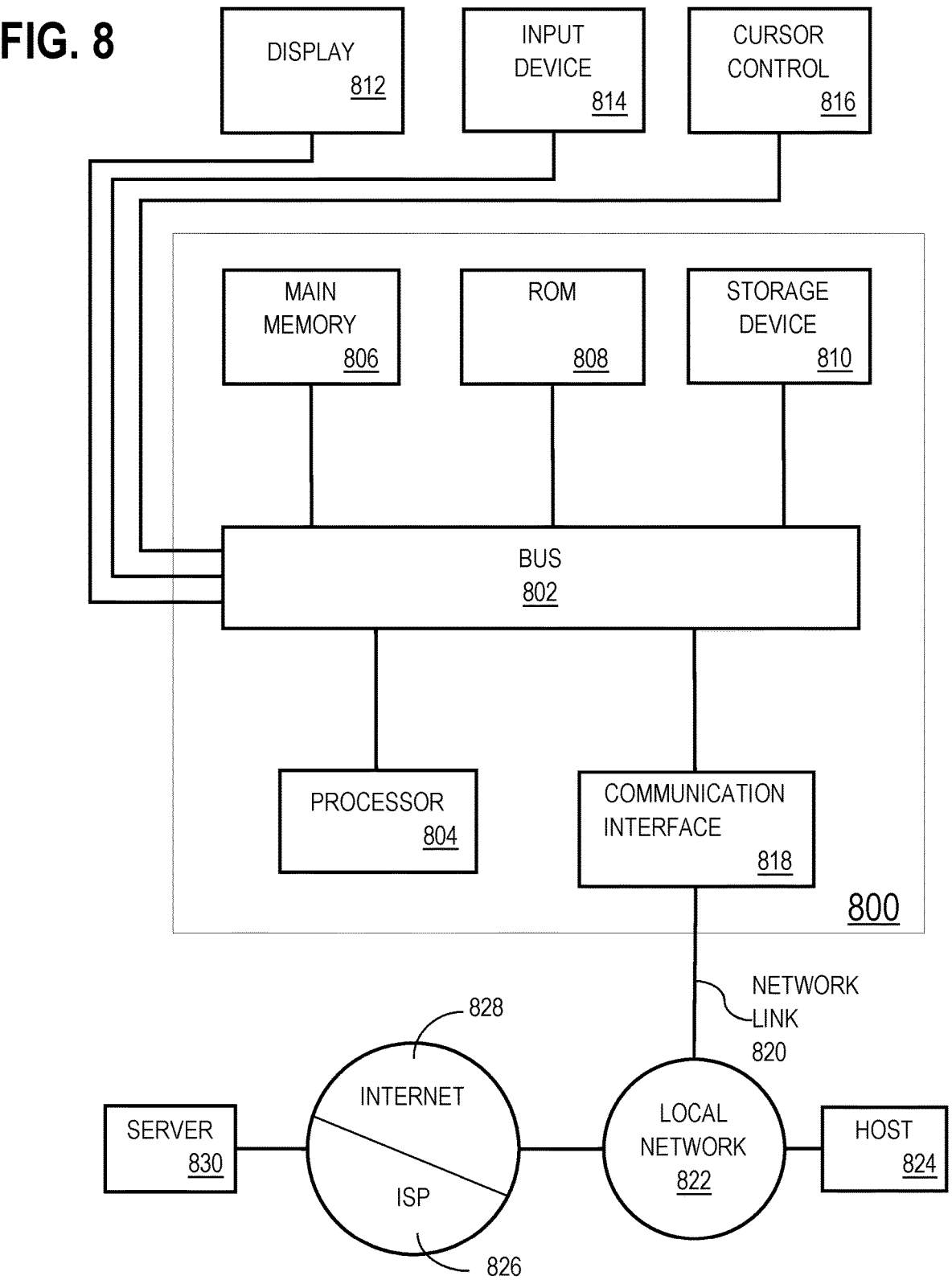
FIG. 8 shows a block diagram that illustrates a computer system in accordance with one or more embodiments.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, optical tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   notifying a gateway, currently configured to direct requests from a client to a first resource, of a future instruction to direct the requests from the client to a second resource,
   wherein subsequent to the notifying operation, the gateway continues to direct requests from the client to the first resource;
   directing the first resource to transfer state information of the first resource to the second resource;
   receiving, from the first resource, a notification that the transfer of the state information to the second resource is complete; and
   subsequent to receiving the notification from the first resource:
   providing to the gateway the future instruction to forward the requests from the client to the second resource.

2. The non-transitory computer readable medium according to claim 1, wherein the operations further comprise:
   receiving an instruction to transfer the state of the first resource to the second resource,
   wherein notifying the gateway is performed based on the receiving the instruction.

3. The non-transitory computer readable medium according to claim 1, wherein the first resource and the second resource are replicated state machines.

4. The non transitory computer readable medium according to claim 1, wherein the operations further comprise:
   subsequent to receiving the notification from the first resource:
      transmitting to the first resource a terminal instruction; and
      receiving from the first resource an acknowledgement of processing of the terminal instruction,
   wherein the directing the gateway to forward the requests to the second resource is performed based on the receiving the acknowledgement.

5. The non-transitory computer readable medium of claim 1, wherein the requests directed from the gateway to the first resource subsequent to the notifying operation alter a state of the first resource, and
   wherein the notification that the transfer of the state information to the second resource is complete includes a notification that the transfer of state information, including information associated with the altered state of the first resource, is complete.

6. A non-transitory computer readable medium comprising instructions which, when executed by one or more hardware processors, causes performance of operations comprising:
   forwarding, by a gateway, a set of requests from a client to a first resource;
   subsequent to forwarding the set of requests to the first resource:
      receiving, by the gateway, a first message indicating a future re-assignment of the client from the first resource to a second resource;
      subsequent to receiving the first message, continuing to forward, by the gateway, requests from the client to the first resource;
      receiving, by the gateway, a second message indicating that the first resource is not configured to process requests from the client;
      responsive to receiving the second message, re-assigning, by the gateway, the client from the first resource to the second resource;
      receiving, by the gateway, a second set of requests from the client; and
      responsive to receiving the first message and the second message:
   forwarding, by the gateway, the second set of requests to the second resource.

7. The non-transitory computer readable medium of claim 6, the operations further comprising:
   subsequent to receiving the first message:
      receiving, from the client, a third set of requests to the first resource; and
      forwarding the third set of requests to the first resource; and
      subsequent to receiving the second message, stopping the forwarding of the third set of requests to the first resource.

8. The non-transitory computer readable medium of claim 7, the operations further comprising:
   subsequent to receiving the second message:
      receiving, from the client, a fourth set of requests to the first resource; and
      generating a response to the client indicating the fourth set of requests is undeliverable to the first resource.

9. The non-transitory computer readable medium of claim 8, the operations further comprising:
   receiving a third message indicating the second resource is prepared to receive requests from the client,
   wherein the second set of requests is received subsequent to receiving the third message, and
   wherein the second set of requests is forwarded to the second resource based on receiving, by the gateway, the first message, the second message, and the third message.

10. The non-transitory computer readable medium of claim 6, wherein the first message includes location information of the second resource, and
    the gateway forwards the second set of requests to the second resource based on the location information in the first message.

11. The non-transitory computer readable medium of claim 10, wherein the second message does not include any location information of the second resource.

12. The non-transitory computer readable medium of claim 6, wherein the first resource and the second resource are replicated state machines.

13. A non-transitory computer readable medium comprising instructions which, when executed by one or more hardware processors, causes performance of operations comprising:
    receiving, by a first resource, an instruction to transfer current state information of the first resource to a second resource;
    subsequent to receiving the instruction:
       receiving a first set of requests from a client;
       processing, by the first resource, the first set of requests to generate updated state information of the first resource;

transferring the current state information to the second resource; and transferring to the second resource the updated state information based on the first set of requests; and generating a first confirmation message confirming transferring the current state information and the updated state information to the second resource.

14. The non-transitory computer readable medium of claim 13, the operations further comprising:
subsequent to generating the first confirmation message:
receiving a second set of requests from the client;
receiving a terminal instruction;
transferring to the second resource second updated state information based on the second set of requests; and
generating a second confirmation message confirming processing of the terminal instruction.

15. The non-transitory computer readable medium of claim 13, wherein the first resource and the second resource are replicated state machines.

16. A system, comprising:
one or more processors; and
memory storing instructions that, when executed by the one or more processors, cause the system to perform operations comprising:
receiving, by a first resource, requests from one or more clients;
storing, by the first resource, state information according to the received requests;
receiving, by a gateway, the requests from one or more clients and forwarding, by the gateway, the requests to the first resource;
initiate, by a controller, a transfer of state information from the first resource to a second resource;
providing, by the controller, a first instruction including address information of the second resource to the gateway;
receiving, by the controller, a first acknowledgement from the first resource confirming the transfer of the state information from the first resource to the second resource;
transmitting, by the controller, to the first resource a terminal instruction;
receiving, by the controller, a second acknowledgement from the first resource confirming a transfer of updated state information and the terminal instruction to the second resource; and
based on receiving the second acknowledgement, transmitting to the gateway a second instruction to direct the gateway to forward traffic, addressed to the first resource, to the second resource,
wherein, subsequent to receiving the address information of the second resource and prior to receiving the second instruction, the gateway continues to direct the requests from the one or more clients to the first resource.

17. The system of claim 16, wherein the operations further comprise:
after receiving, by the gateway, the first instruction from the controller:
receiving a first set of requests addressed to the first resource; and
generating a first message indicating the first set of requests in undeliverable.

18. The system of claim 17, wherein the operations further comprise:
after receiving, by the gateway, the second instruction:
receiving a second set of requests addressed to the first resource; and
forwarding the second set of requests to the second resource.

19. The system of claim 18, wherein the operations further comprise:
subsequent to generating the first acknowledgment:
receiving, by the first resource, a second set of requests from the client;
receiving the terminal instruction;
transferring to the second resource second updated state information, including the terminal instruction, based on the second set of requests; and
generating the second acknowledgment confirming processing of the terminal instruction.

20. The system of claim 16, wherein the operations further comprise:
receiving, by the first resource from the controller, a third instruction to initiate the transfer of the state information from the first resource to the second resource;
subsequent to receiving the third instruction:
receiving a first set of requests from a client;
transferring the state information to the second resource; and
transferring to the second resource first updated state information based on the first set of requests; and
based on transferring the first updated state information, generating the first acknowledgment.

21. The system of claim 16, wherein the first resource and the second resource are replicated state machines.

* * * * *

UNITED STATES PATENT AND TRADEMARK OFFICE
CERTIFICATE OF CORRECTION

| | |
|---|---|
| PATENT NO. | : 11,522,955 B2 |
| APPLICATION NO. | : 17/015458 |
| DATED | : December 6, 2022 |
| INVENTOR(S) | : Efimov et al. |

It is certified that error appears in the above-identified patent and that said Letters Patent is hereby corrected as shown below:

In the Specification

In Column 3, Line 15, after "via" delete "the".

In Column 10, Line 49, delete "111" and insert -- 111. --, therefor.

In the Claims

In Column 17, Line 37, in Claim 4, delete "non transitory" and insert -- non-transitory --, therefor.

Signed and Sealed this
Eighth Day of August, 2023

Katherine Kelly Vidal
*Director of the United States Patent and Trademark Office*